Sept. 20, 1927.　　　　F. HAUPT　　　　1,642,813

DUMPING CAR

Filed June 1, 1925

Inventor:
Ferdinand Haupt by [signature]

Atty.

Patented Sept. 20, 1927.

1,642,813

UNITED STATES PATENT OFFICE.

FERDINAND HAUPT, OF BORNA, NEAR LEIPZIG, GERMANY.

DUMPING CAR.

Application filed June 1, 1925, Serial No. 34,158, and in Germany June 10, 1924.

My invention relates to dumping cars and more especially to side dumping cars equipped with a flap or gate in which the body is supported on one side by a movable bracket and dumped to the other side.

In the usual type of car the flap control mechanism comprises a rod which is under compression during operation. Mechanism of this kind is unsatisfactory not only because the rod requires a comparatively large diameter, but also because the load on the underframe is all on one sole bar which therefore is under bending as well as torsional stress.

It is an object of my invention to provide a dumping car in which the flap is held in position during the dumping operation by parts under tension.

To this end, I extend the frame of the flap beyond its fulcrum on the body and to the shorter arm of the double-armed lever so formed I connect a drawbar the other end of which is adapted to co-operate with a check which holds the flap in its open position. When the car has been dumped, the weight on the side of the body which is opposite the dumping side exceeds that on the dumping side and so the body tends to return to its normal position and to close the flap.

In the drawings affixed to this specification and forming part thereof a dumping car embodying my invention is illustrated diagrammatically by way of example.

Figures 1, 2, 3:
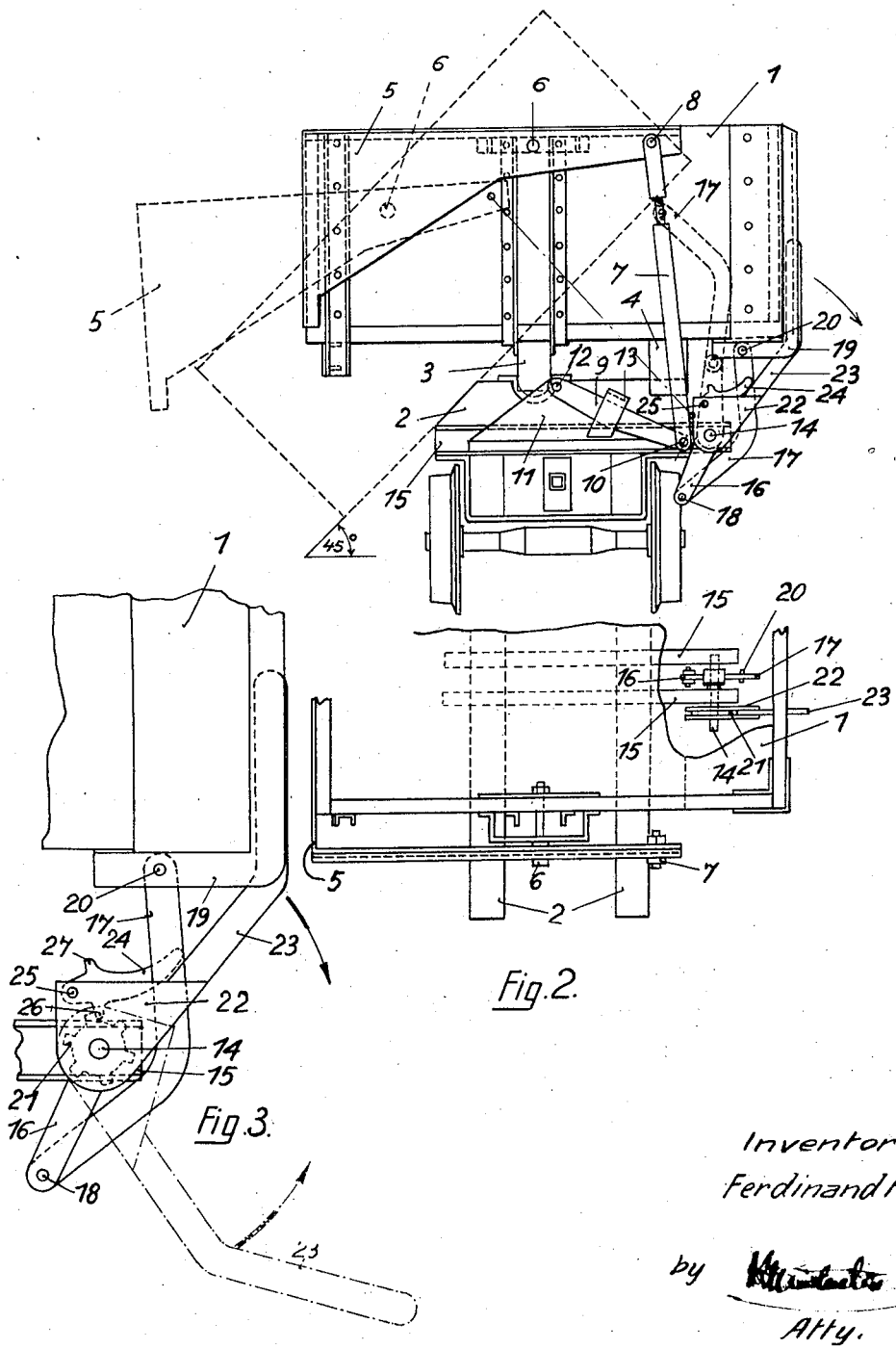
Fig. 1 is an end elevation of a dump car embodying my invention.
Fig. 2 is a plan view.
Fig. 3 shows a detail of the dumping mechanism drawn to a larger scale.

Referring to the drawings, 1 is the body and 2 is the underframe of the car, 3 being a pivot by means of which the body is supported on the underframe. The pivot 3 is so arranged with regard to the centre of gravity of the body 1 that the body tends to rest on the support 4 opposite the dumping side. 5 is the flap for closing the open side of the body 1. The frame of the flap is pivoted to the body 1 at 6 and a drawbar 7 is pivoted to the frame at 8 and to a lever 9 at 10. The other end of said lever is fulcrumed on a bracket 11 at 12 and a check 13 is secured to the bracket for arresting the lever 9 when it has turned through a predetermined angle.

14 is a shaft carried in a pair of transverse stays 15, 15 which may be of channel iron, 16 is a crank keyed on said shaft and 17 is a link which is pivoted to said crank at 18 and to a bracket 19 below the bottom of the car body at 20.

21 is a ratchet wheel having straight radial teeth and keyed on the shaft 14 outside the stays 15, and 22, 22 are shrouds on either side of the wheel which are free to turn on the shaft 14. A handle 23 is secured to both shrouds, and a pawl 24 is arranged between said shrouds on a fulcrum 25 and adapted to alternately engage the teeth of the wheel 21 with one of its teeth 26 or 27.

When it is desired to dump the car body, the pawl 24 is lifted out of the teeth of the ratchet wheel 21 with its tooth 26, the handle 23 is turned downwards into the position shown in dotted lines in Fig. 3, the pawl 24 is thrown into the teeth of the ratchet wheel 21 with its tooth 27 and the handle 23 is turned upwards. Its motion is transmitted to the shaft 14 by the shrouds 22 and the pawl 24 and the crank 16 on the shaft raises the body 1 on one side, so that it turns on its pivot 3 until it is inclined at an angle of about 45 degrees, as shown in dotted lines in Fig. 1. The handle 23 is now in its vertical initial position. The flap 5 partakes in the motion of the body 1 until the lever 9 is arrested by the check 13 and in turn arrests the flap 5 so that it lays open the descending car body.

In order to return the body to normal position, the pawl 24 is thrown over so that its tooth 26 engages the ratchet wheel, and the handle 23 is again turned in the direction of the arrow, causing the body 1 to return to its normal position.

I wish it to be understood that I do not desire to be limited to the exact details of construction shown and described, for obvious modifications will occur to a person skilled in the art.

I claim:

Dumping car comprising an underframe, a body pivotally supported on said underframe, means for rocking said body on said underframe, a frame pivoted on said body, a flap secured to one end of said frame, a lever fulcrumed on said underframe, a drawbar linked to the other end of said frame and to said lever, and a check on said underframe adapted to limit the stroke of said lever.

In testimony whereof I affix my signature.

FERDINAND HAUPT.